United States Patent [19]
Schroder

[11] 3,800,650
[45] Apr. 2, 1974

[54] APPARATUS FOR THE TEMPLATE CUTTING OF WORKPIECES

[75] Inventor: Josef Schroder, Wurselen, Germany

[73] Assignee: Fecken-Kirfel KG Maschinenfabrik, Aachen, Germany

[22] Filed: June 30, 1972

[21] Appl. No.: 267,867

[30] Foreign Application Priority Data
Sept. 9, 1971 Germany............................ 2145062

[52] U.S. Cl....................... 83/789, 83/563, 83/565, 83/794
[51] Int. Cl..... B23d 53/04, B23d 53/08, B26d 1/46
[58] Field of Search ......... 83/1, 563, 565, 789, 794, 83/3

[56] References Cited
UNITED STATES PATENTS

| 3,587,378 | 6/1971 | Oppenheim | 73/565 X |
| 3,254,685 | 6/1966 | Hawkins | 83/565 X |
| 3,398,620 | 8/1968 | Gautron | 83/565 X |
| 3,254,684 | 6/1966 | Hawkins | 83/789 |

FOREIGN PATENTS OR APPLICATIONS
1,162,064  1/1964  Germany .............................. 83/789

*Primary Examiner*—Willie G. Abercrombie
*Attorney, Agent, or Firm*—Markva & Smith

[57] ABSTRACT

The apparatus includes a means for cutting through a vertically disposed surface of a workpiece that is maintained in a stationary position. The cutting means is movably supported for movement along the vertically disposed surface. Means are provided for scanning a pattern defined by a template. The movement of the cutting means is directed along the vertically disposed surface of the workpiece and responds to the positional location of the scanning means along the template pattern.

21 Claims, 7 Drawing Figures

APPARATUS FOR THE TEMPLATE CUTTING OF WORKPIECES

BACKGROUND OF THE INVENTION

It is known to effect template cutting on workpieces such as resilient blocks of cellular plastic material, layers of textile fabrics and the like. Such template cutting is presently done manually or with the aid of vertical cutting machines. In one instance, a vertical cutting machine having a belt knife is used to effect cutting of a block of cellular plastic material. The workpiece is placed on a table having a smooth surface where it is supported in a stationary position. The table includes a recess formed in the center thereof to accommodate the belt knife. The template is disposed on the resilient workpiece body. Both the workpiece and the template are guided and rotated to the belt knife so that a cut is effected along the template edge.

Another prior art method of effecting template cutting includes the guiding of a vertical cutting unit around the workpiece. In this instance, the supporting surface is formed by a table which is smaller than the template cut. The table surface is also shaped to correspond substantially to the shape of the template. Therefore, it is necessary to change the table base plate when effecting a different table cut. Such a prior art arrangement requires a considerable amount of space and the cutting apparatus is extremely bulky. Furthermore, the output of the prior art cutting device is limited. A considerable amount of time is wasted in these processes, thereby necessitating a relatively high cost for the number of workpieces produced.

PURPOSE OF THE INVENTION

The primary object of this invention is to provide an apparatus for the automatic template cutting of workpieces such as layers of textile fabrics and resilient block material.

Another object of this invention is to provide an apparatus employing a template and a cutting means in such a relationship wherein accurate and neat template cuts may be effected.

A further object of this invention is to provide an apparatus for effecting template cutting of a workpiece wherein the templates may be interchanged at will with only a minimum disruption of the cutting operation.

A still further object of this invention is to provide an apparatus for effecting template cutting of a workpiece wherein a large number of template cuts can be effected along a vertically disposed surface of a workpiece block and workpieces having various lengths may be machined.

SUMMARY OF THE INVENTION

These objects and other advantages may be accomplished through the apparatus as disclosed herein. The workpiece is supported in a stationary or at rest position. A means is arranged for cutting through a vertically disposed surface of the workpiece. That is, the apparatus includes a horizontally disposed cutting means. A scanning means is used to sense a pattern defined by a template. A transmission means is used for directing movement of the cutting means along the vertically disposed surface of the workpiece in response to the positional location of the scanning means along the template pattern.

A specific feature of the invention is directed to the use of a blade member that is arranged to be pivotal about its longitudinal axis within the working or cutting zone. The angular deflection of the pivoting movement is controlled as a function of the sensing device operating at the template. More specifically, the drive for the feed movements of the blade member in vertical and horizontal directions which lie in a plane parallel to the vertically disposed surface of the workpiece is derived from the motion of the scanning means.

Another feature of the invention is directed to the use of a band-like cutting blade member which can be used over an angular range of 360° in either direction from a neutral position. Such a band-like cutting blade, to minimize torsional stresses, is adapted to be adjusted by rotationally pre-staggering through 180° relative to the neutral position of the cutting blade member. Such a pre-staggering operation is accomplished at the beginning of the template cut. More specifically, the blade member is pre-rotated through −180° so that upon moving around the entire pattern to be cut in accordance with the template, the blade member will have adopted a position of +180°. The cutting blade is brought back to the initial rotational pre-staggered position of −180° for the next template cut. In accordance with this invention, the cutting blade can be rotated further toward either side of the neutral position so that profiles having corresponding undercuts may be cut in a simple manner.

Another feature of the invention is directed to the manner in which the template scanning means is operated. Details of such a structure and its operation are disclosed hereinbelow.

A further feature of the invention is directed to the structure of a transmission means for transmitting the movement of the scanning means about the template to the particular cutting means being employed in the apparatus. Such a feature is described in detail hereinbelow.

BRIEF DESCRIPTION OF DRAWINGS

Other features of this invention will appear in the following description and appended claims, reference being made to the accompanying diagrammatic drawings forming a part of the specification wherein like reference characters designate corresponding parts in the several views.

DESCRIPTION OF SPECIFIC EMBODIMENTS

Figure 1:
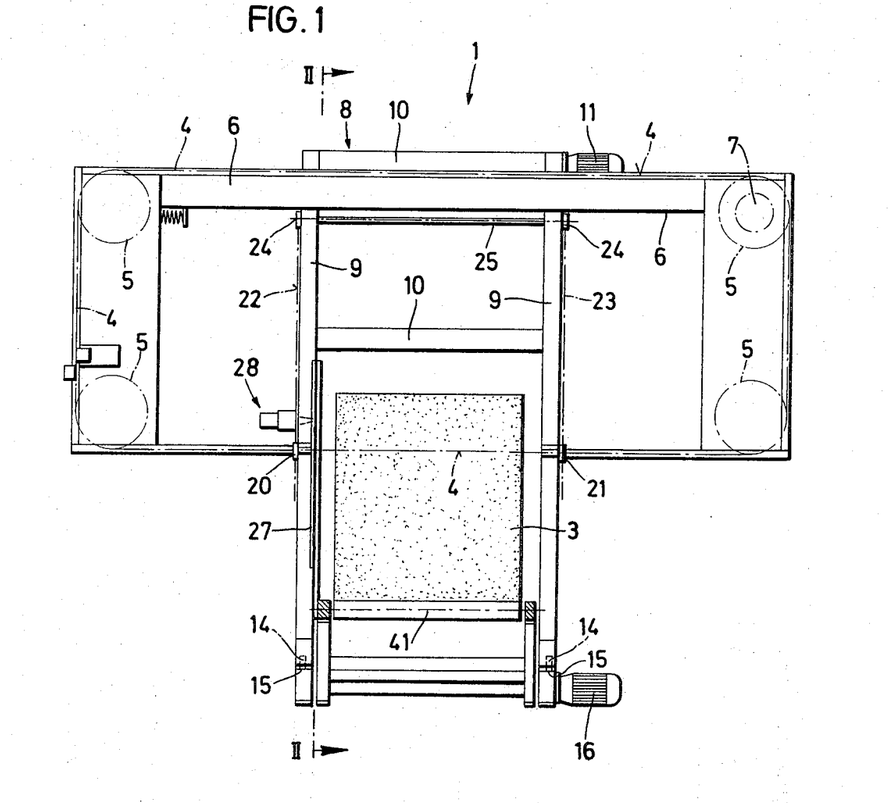
FIG. 1 is a front elevational view of a template cutting device according to this invention.
Figure 2:
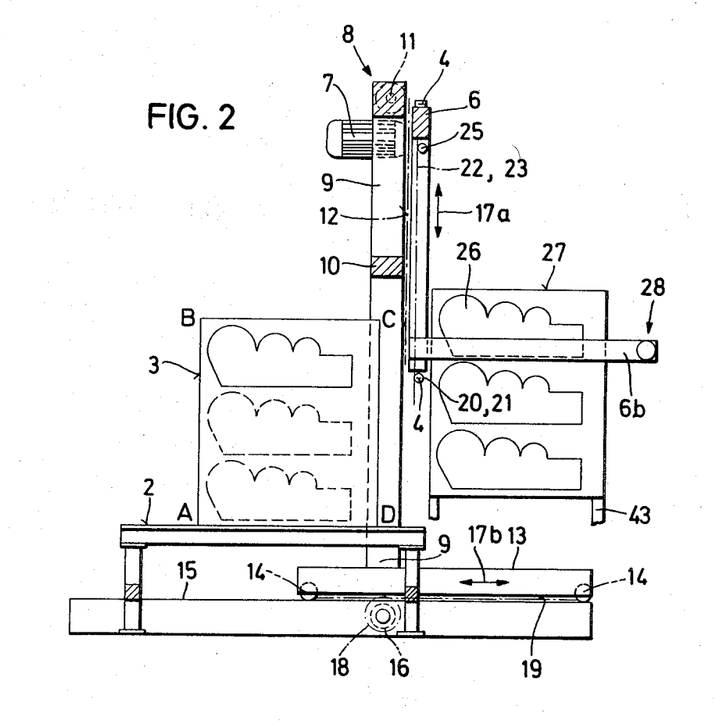
FIG. 2 is a sectional view along line II—II of the cutting device of FIG. 1, showing a stationary material support table.

As seen in FIGS. 1 and 2, the template cutting device, generally designated 1, has a table-like support surface 2 for mounting the workpiece 3 which is to be cut into a template. The workpiece 3 is made of resilient material such as cellular plastics or the like in this specific embodiment. The material block 3 is held in a stationary position by means of a vacuum or with the aid of a holding frame or the like.

A band type cutting means is in the form of an endless belt knife 4. A reciprocating or oscillating blade or belt knife may also be used with this invention. The endless cutting knife 4 shown in this embodiment is guided over four pulleys 5 mounted in the frame 6. One of the pulleys 5 is driven by a motor 7. The frame 6 is supported and guided for vertical displacement along an upright support, generally designated 8. The upright support member 8 comprises the side members 9 and cross members 10.

Vertical adjustment of the frame 6 is effected by means of a motor 11. Sprocket wheels (not shown) are mounted on the shaft of the motor 11 and engage chains 12 secured to frame 6. The upright support member 8 includes a guide post 9 and is mounted on a movable carriage 13. The carriage 13 is mounted on travel wheels 14 which are guided on rails 15. A motor 16 driving pinion gear 18 meshes with a rack gear 19 secured to the carriage 13. Thus, the cutting unit can be moved forwardly and backwardly in the longitudinal direction, as shown by arrows 17b, and upwardly and downwardly in a vertical direction, as shown by arrows 17a, by proper energization of the motors 11 and 16. The frame 6 can be balanced by means of counterweights (not shown) where necessary.

The distance between the side members 9 defines a cutting zone which exceeds the width of the material 3 that is to be cut. The belt knife 4 is threaded through guide members 20 and 21 and is arranged to travel freely between the guide members 20 and 21 for cutting the material. The guide members 20 and 21 are rotatably mounted to turn the blade 4 around its longitudinal axis. The guide members 20 and 21 are arranged to synchronously rotate by a transmission means including racks 22 and 23, pinions 24 and connecting shafts 25. Thus, the narrow belt knife 4 may be rotated during the cutting operation through 360°. Rotation is effected in each particular case at least 360° in one or the other direction of rotation out of a neutral position. In order to keep the torsional stresses in the belt knife 4 at the lowest possible level, the spacing between the lower support pulleys 5 and the guide members 20, 21 is designed to be as long as possible, thereby requiring the frame 6 to project a substantial amount in either direction from the edges of the upright support 8.

A scanning device 28 is supported by an arm 6b that extends outwardly from the cutting frame 6. The arm 6b includes a housing for transmission elements contained therein. A template 26 is mounted on a panel 27 and positioned on the opposite side of the cutting frame 6 from the workpiece 3, a plurality of templates 26 may be attached in stacked relation on the panel 27. The template may comprise a line drawing or clear outline of the pattern to be cut from the workpiece.

Figure 4:
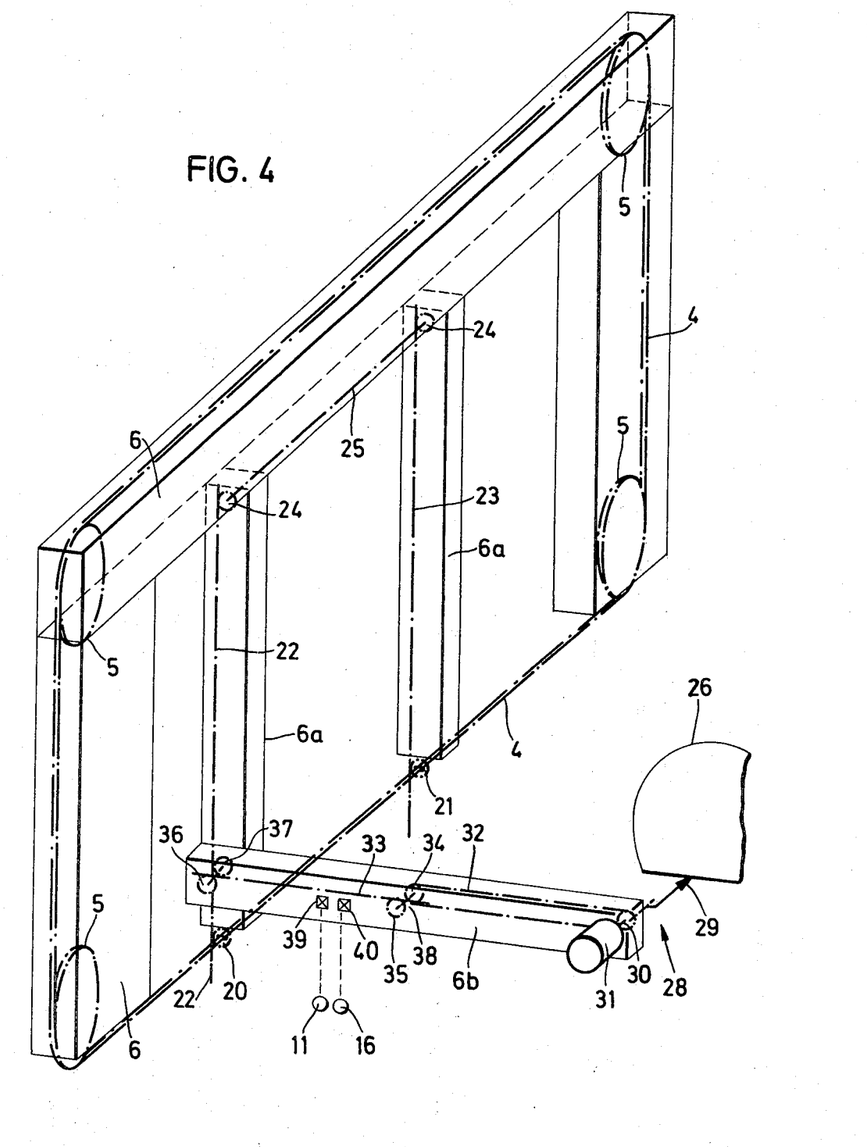
FIG. 4 is a perspective view of a scanning device and a blade guide means of the present invention.
Figure 5:
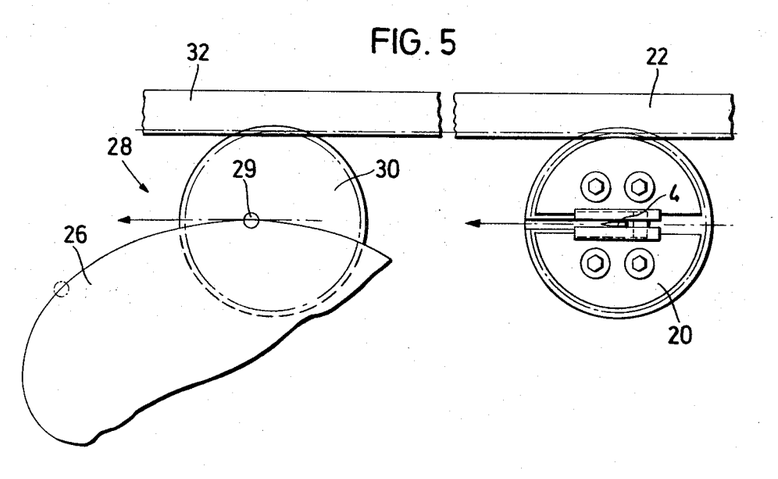
FIGS. 5 and 6 are schematic presentations of the relationship of the scanning device and the blade guide means during a template profile tracing operation.
Figure 6:
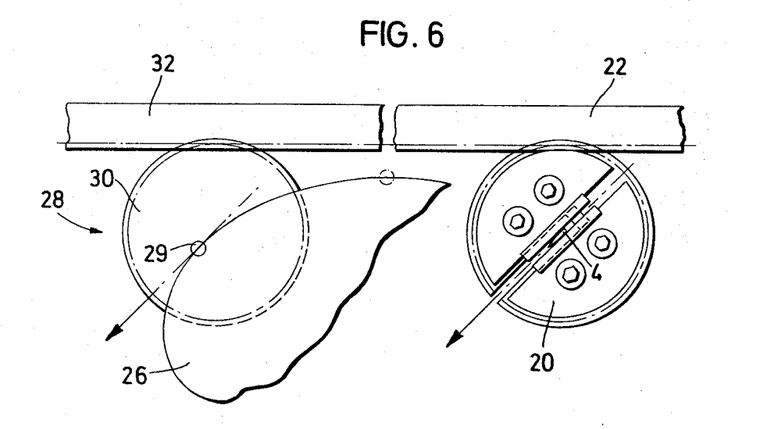

The scanning device 28 includes a photoelectrical sensing device 29 operating as a reflex barrier. The sensing device 29 is eccentrically mounted on a disc 30 so that it is movable within a circular path. A step-by-step or servo motor 31 is used to effect rotational drive of the disc 30. The sensing device 29 is so retained by guide rod (not shown) that the punctiform spot of light emanating from the device 29 defines a circular path corresponding to the movement of the device 29 upon rotation of the disc 30.

The angular position of the sensing device 29 with respect to the center of the circular path is transmitted to the cutting means operating on the workpiece 3. The reflex responsive sensing device 29 endeavors to bear continuously against the edge of the template 26 as it moves within its circular path of rotation upon the rotation of the disc 30. With reflections being returned from the template 26 to the sensing device 29, the disc 30 rotates toward the left as viewed in FIG. 4. When there is a reflection from the template 26 to the sensing device 29, the disc 30 rotates toward the right. The servo motor 31 effects this rotation in extremely small steps or increments at approximately 200 times per second. The particular position of a connecting line from the center point of the circular path of movement to the eccentric position of the sensing device 29 assumes the direction of the tangent to the template edge. When a crank arm is used in place of the disc 30, its angular position assumes the direction of the tangent of the template edge. The angular position of the connecting line is transmitted to a movable supporting means for the cutting device operating on a vertically disposed surface of the workpiece 3. As the cutting unit advances along the x-axis and y-axis, it is directed by the angular position of the connecting line by way of potentiometers 39 and 40. The belt blade 4 is put into the same tangent as the connecting line by way of the transmission elements contained within the arm 6b and elements 22, 23, 24 and 25. Simultaneously, the blade 4 adopts the same tangent direction as the scanning device 29. The tangent direction corresponds to the necessary cutting direction. The potentiometers 39 and 40 transmit a signal voltage to their respective servo motors 11 and 16 to properly effect the positioning of the cutting unit. The potentiometers 39 and 40 are sin/cos type potentiometers. The maintenance of accuracy in the reproduction of the pre-determined template pattern or contours is achieved through the transmitting of the tangential direction of the eccentrically mounted scanning device 29 to the cutting blade 4 by way of a particular transmission means.

The transmission means includes a toothed belt 32, pinions 34, 35, 36 and 37, and rack 33. The toothed belt 32 transmits the rotational movements of the disc 30 to the pinion 34. Pinion 35 is attached to pinion 34 by a shaft (not shown) and rotates in response to the movement of belt 32. The pinion 35 engages the elongated gear rack 33. The opposite end of the gear rack 33 is meshed with pinion gear 36. The pinion gear 36 is connected to pinion 37 which in turn meshes with elongated gear rack 22. Rack 22 is mounted for vertical movement along the frame support member 6a and is intermeshed with guide member 20. The upper end of the rack 22 is meshed with pinion 24 to rotate the shaft 25. A second elongated rack 23 is interconnected between pinion 24 and the second guide member 21. Movement of the guide members 20 and 21 has been described hereinabove.

In this specific embodiment, a resilient clutch 38 is advantageously placed between pinions 34 and 35 to dampen the oscillatory movements of the step motor 31 in order to obtain smooth rotational movements during transmission to the guide members 20 and 21. It is important that only a continuous operational movement be transmitted to the guide members 20 and 21 during the oscillating movement of the scanning device 29. The potentiometers 39 and 40 are activated by one of the gearing elements, specifically rack 33, in order to energize the servo motors 11 and 16.

The band type belt knife 4 is able to sweep over every point along a vertically disposed lateral face of the workpiece 3 as defined by rectangle A-B-C-D. In a method effected in accordance with this invention, the belt knife 4 to minimize stresses is rotationally pre-staggered between the guide members 20 and 21 at the beginning of the cutting operation. The pre-rotation is effected through −180° in one direction relative to the neutral position. Upon traveling around the template cut as the scanning device 29 moves around the template 26, the blade 4 will have adopted a position of +180°. The rotation of the blade 4 about its longitudinal axis will have gone beyond the neutral position. Upon readying the apparatus of this invention for the next template cut, the belt knife 4 is again rotationally pre-staggered to −180°. It is possible to cut contours or patterns from the workpiece 3 having corresponding undercuts in both directions because blade 4 is capable of moving through a rotational zone of 360° in either direction from the neutral position as described. Thus, it is seen that the knife can be rotated a total of 720°, if desired.

Figure 3:
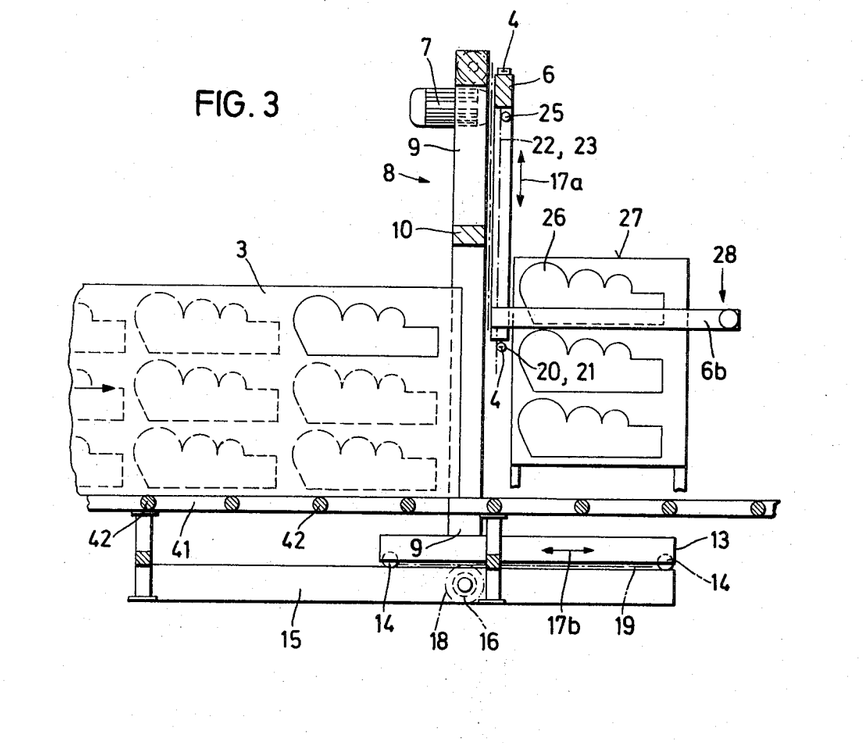
FIG. 3 is a sectional view of the cutting device as in FIG. 2, showing a movable material support surface.

In the embodiment of FIG. 3, the workpiece 3 is mounted on a roller conveyor 41. The conveyor 41 includes rollers 42 for longitudinally moving the block 3 into and away from the cutting zone. The template cutting operation is effected while the conveyor 41 is stationary. After completion of a first template cut, the conveyor 41 may be intermittently advanced with a pitch corresponding to the template length. That is, the block material 3 may be of any desired length and machined in an extremely simple manner. The template 26 may be fixed in position by any desired fastening mechanism.

The cutting device of this invention generally operates as follows. After the workpiece 3 and the template 26 are mounted in their proper positions, the scanning device 28 senses and traces the outline profile of the template 26 in a complete closed path. A servo motor 31, in response to the sensing device 28, causes the cutting blade 4 to be rotated around its longitudinal axis by the guide members 20 and 21. Consequently, the blade 4 is always held in a tangent line position parallel to a tangent line defined at the scanned edge portion of the template 26. The servo motors 11 and 16 move the carriage 13 and frame 6, respectively, in response to the angular position of the tangent line, thereby continuously feeding the cutting blade 4 along the vertically disposed working face.

Figure 7:
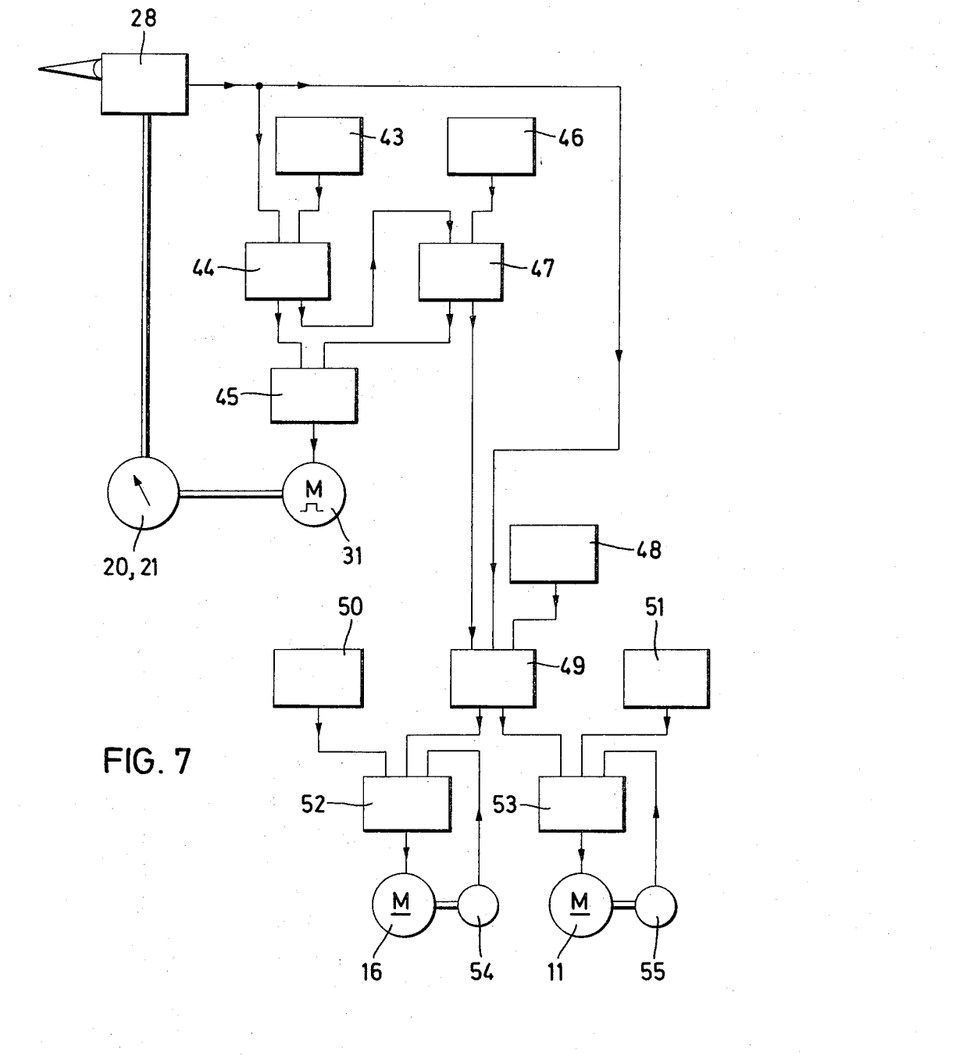
FIG. 7 is a block diagram illustration of the control circuitry used in the operation of the present invention.

An electrical control system for the apparatus of this invention is shown in FIG. 7. The sensing device 28 is designed as a reflex head and is directly connected via a transmission means for synchronous movement with the cutting blade guide members 20 and 21. The drive servo motor 31 is used to rotate the scanning device 28. The control system includes on-off switch 43, manual automatic system 44, control apparatus for cutter rotation 45, pre-setting apparatus for cutter rotation 46, servo control 47, pre-setting mechanism for cutting velocity 48, curvature comparison apparatus 49, control mechanism 50 and 52 for the x-direction, control mechanism 51 and 53 for the y-direction, servo motor 16 for the x-direction, servo motor 11 for the y-direction, and tachogenerators 54 and 55.

The reflex head or sensing device 28 and the cutter guide members 20 and 21 are rotated by the servo motor 31. The direction of advance for the cutting means is manually adjusted at the control panel with the pre-setting means 46. That is, the rotation of the cutting blade 4 is first adjusted by the pre-setting means 46. The drive motor 31 adjusts the belt knife 4 and the reflex head 28 in the desired pre-selected direction by way of the servo control 47 and the control apparatus 45 for cutter blade rotation. The control element 43 includes five Hall generators used to monitor the position of the cutter blade 4.

When the cutter belt 4 is in the pre-selected direction, the advance or feed in that direction begins. The reflex head 28 then travels toward the template 26. Initially, this movement of the cutter head is controlled manually. Transition from manual to automatic operation of the apparatus takes place upon the first reflection at the template 26. Upon reflection, the motor 31 rotates the head 28 clockwise until the reflection is interrupted adjacent the edge of the template 26. Then, without reflection, the motor 31 rotates the head 28 counterclockwise. This change between reflection and non-reflection takes place approximately 200 times per second at the template edge. As the sensing device 29 rotates, the sin/cos potentiometers 39 and 40 feed respective signals to the control means 51 and 50, for movement of the cutting unit in the y-direction and x-direction, respectively. In this embodiment the servo motors 11 and 16 are of the low-mass, disc-rotor type.

The travel velocity of the cutting means 4 is shifted over to slow when small curvature radii are being cut. Curvature comparison is made by the apparatus 49 and is effected by way of timing elements which evaluate the chronological sequence of the left-hand and right-hand steps. The high travel velocity may be switched for extremely small templates by way of the pre-selector means or pre-setting mechanism 48 used to control the cutting velocity. The control appliances 52 and 53 control the low-mass disc-rotor motors 62 and 11, respectively, for movement of the cutting unit in the x-direction and the y-direction. The tachogenerators 54 and 55 are incorporated with each servo motor to provide the necessary feedback corrections for stable servo operation. After a complete rotation about the pattern in the template 26, the template cutting motion is automatically switched off.

ADVANTAGES OF THE INVENTION

An apparatus made in accordance with this invention permits the feeding of workpiece blocks of optional lengths. Only the height and the width become determining factors with respect to the overall size of the apparatus of this invention. Furthermore, any one apparatus can operate upon any length of the workpiece. In this way, the production of waste is greatly reduced.

Since the cutting blade member is designed to be pivotal about its longitudinal axis within the cutting zone, it is possible to achieve an extremely neat template cut. That is, the minimum possible mass is being displaced for the purpose of maintaining the feed of the band-shaped blade member in the tangential direction with respect to the contour or pattern of the template cut. There is simply effected a pivoting of the band-shaped cutting blade over a pre-determined path length. The forces required to accomplish this result are small and the pivoting or oscillating movement of large masses is eliminated. In this way, with this arrangement, easy running and sensitive control are possible for the pivoting movement of the cutting means in the cutting zone. Therefore, the specific rotational movement about the longitudinal axis in combination with the position of the workpiece present an entirely satisfactory and neat cut in the workpiece without distortion or the like.

While an apparatus for the template cutting of workpieces has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An apparatus for effecting template cutting of a workpiece of resilient material of rubber, plastic such as blocks of foam and the like wherein there is a relative movement effected between the workpiece and the cutting means, said apparatus comprising:
   a. a stationary table for supporting a workpiece in a stationary position during the cutting operation,
   b. a band-shaped cutting means having a cutting portion pivotal about its longitudinal axis in the operating area of the workpiece for cutting through a vertically disposed surface of the workpiece,
   c. means for displacing the cutting means vertically and horizontally with said cutting portion being in a horizontal position for cooperating with the vertically disposed surface of the workpiece while said workpiece is resting on the stationary table,
   d. means for scanning a pattern defined by a template,
   e. the angular deflection of the pivotal movement of said band-shaped cutting means being controllable in response to said scanning means operating at said template,
   f. drive means for advancing movement of the cutting means in response to the movement of the scanning means.

2. An apparatus as defined in claim 1 wherein said cutting portion of the band-shaped cutting means is adapted to be adjusted rotationally prestaggered with respect to the neutral position through at least 180° in either direction from said neutral position to effect a complete 360° rotation.

3. An apparatus as defined in claim 1 wherein said scanning means is movably supported along a circular path and
said drive means includes a step-by-step motor to effect rotary drive along said circular path, a rotating device for the cutting means and members connecting the scanning means to the rotating device,
the angular position of said scanning means with respect to the center point of the circular path being transferrable by means of said connecting members.

4. An apparatus as defined in claim 1 wherein said drive means includes an upright frame member mounted to be transversely displaceable with respect to the cutting means, a frame means adjustably mounted on said upright frame member to be vertically movable with respect to said upright frame member, and one servo motor each of which effects movement of the frame means and the upright frame member.

5. An apparatus as defined in claim 4 wherein said drive means includes members for transmitting movement of the scanning means to said cutting means,
said servo motors for the frame means and the upright frame member being controllable by one potentiometer each influenced by said transmission members.

6. An apparatus as defined in claim 1 wherein said drive means includes cutting member guides located at each end of said cutting portion,
gearing elements such as toothed belts, gear wheels and a rack and members for transmitting rotational movement to the cutting member guides,
said scanning means being mounted on an eccentric disc the rotational movement of which may be transferred to one of the transmitting members for the cutting member guides by means of said gearing elements.

7. An apparatus as defined in claim 6 wherein said gearing elements include an elastic coupling interconnecting said gear members.

8. An apparatus as defined in claim 1 wherein a panel is adjustable in height and arrestable by means of said template.

9. An apparatus as defined in claim 1 wherein said pattern scanned by said scanning means is defined by a plurality of templates arranged one below the other and/or side by side.

10. An apparatus as defined in claim 1 wherein said pattern scanned by said scanning means is defined by a line drawing.

11. An apparatus as defined in claim 1 wherein said stationary table is longitudinally displaceable before and after the cutting operation.

12. An apparatus for effecting template cutting of a workpiece comprising:
   a. stationary table for supporting a workpiece in a stationary position,
   b. a band-shaped cutting blade means for cutting through a vertically disposed surface of the workpiece,
   c. said band-shaped cutting means having a cutting portion rotatable about its longitudinal axis,
   d. means for movably supporting the cutting means for movement along the vertically disposed surface,
   e. means for scanning a pattern defined by a template,
   f. said scanning means including a sensing means and a means to move said sensing means in a circular path thereby establishing a particular angular position of a line connecting the center point of the circular path of movement to the position of the sensing means, and
   g. transmission means for directing movement of the cutting blade means along the vertically disposed surface of the workpiece in response to the positional location of the sensing means along the template pattern.

13. An apparatus for effecting template cutting of a workpiece comprising:

a. a stationary table for supporting a workpiece in a stationary position,
b. a band-shaped cutting blade member for cutting through a vertically disposed surface of the workpiece,
c. said blade member being rotatable about its longitudinal axis,
d. means for movably supporting the blade member for movement along the vertically disposed surface,
e. said movably supporting means including an upright frame member mounted to move along a horizontal path, a frame member mounted to move in a vertical path along said upright frame member, guideway means disposed on said frame member to rotate the band-shaped cutting blade about its longitudinal axis,
f. said guideway means including two guide members laterally displaced with respect to each other thereby defining a cutting zone therebetween,
g. means for scanning a pattern defined by the template, and
h. transmission means for directing movement of the cutting blade member along the vertically disposed surface of the workpiece in response to the positional location of the scanning means along the template pattern.

14. An apparatus as defined in claim 13 wherein said cutting blade member defines a closed loop mounted over rotatable discs for effecting continuous closed movement thereof,
said guide members being rotatable and effective to rotate the blade member about its longitudinal axis within the cutting zone and being displaced from the rotating disc members by an amount sufficient to maintain the torsional stresses in the closed loop, band-shaped blade member at a minimum.

15. An apparatus as defined in claim 14 wherein said transmission means includes means to rotate the guide members in synchronization as a function of the angular position of the scanning means.

16. An apparatus as defined in claim 15 wherein said synchronous rotating means includes a rack member which operatively engages the rotatably mounted guide members to effect rotation and
said directing movement means includes means to transmit the circular movement of the sensing means to the rack members associated with each guide member to effect rotation of the guide members in response to movement of the sensing means within its circular path.

17. An apparatus as defined in claim 14 wherein said scanning means includes a sensing device and a means to move said sensing device in a circular path thereby establishing a particular angular position of a line connecting the center point of the circular path of movement to the position of the sensing device,
said transmission means including means to transmit the angular position of the sensing means to said guide members for corresponding rotational position of the cutting blade member within the cutting zone.

18. An apparatus as defined in claim 13 wherein said transmission means includes a resilient coupling mechanism to dampen oscillatory movement between the sensing means and the movably supporting means.

19. An apparatus as defined in claim 13 wherein said movably supporting means includes control means adapted to be activated by said transmission means.

20. An apparatus as defined in claim 13 wherein said workpiece supporting means includes means for moving said workpiece to different working positions between cutting operations.

21. An apparatus as defined in claim 13 wherein said cutting means includes an oscillating cutting blade member.

* * * * *